United States Patent Office 2,888,434
Patented May 26, 1959

2,888,434
ACRYLONITRILE POLYMER COMPOSITION CONTAINING THE RECURRING UNIT OF A POLYMERIZED BIS(2-CHLOROETHYL) VINYL PHOSPHONATE

Victor E. Shashoua, Wilmington, Del., assignor to E. I. du Pont de Nemours and Company, Wilmington, Del., a corporation of Delaware No Drawing. Application April 4, 1955
Serial No. 499,207

6 Claims. (Cl. 260—45.5)

This invention relates to product and process. More particularly, it relates to a novel and useful polymer of acrylonitrile containing a recurring unit of the formula:

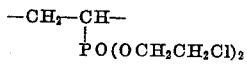

and to a process for its preparation and to novel and useful shaped articles produced therefrom.

By the term "shaped article produced from a polymer of acrylonitrile" is meant a non-fluid structure, i.e. a filament, fiber, pellicle or the like formed by the extrusion or casting of a polymer of acrylonitrile such as is illustrated in U.S. Patent No. 2,436,926 to R. A. Jacobson, dated March 2, 1948, and also the yarn, staple, fabric, laminate and the like produced therefrom. The term "polymer of acrylonitrile" is intended to include any polymer or copolymer of acrylonitrile, wherein the acrylonitrile component constitutes about 50% or more of the polymer molecule calculated as $CH_2=CH-CN$. Among the compounds that may be copolymerized with acrylonitrile may be mentioned vinyl chloride, 2-vinyl pyridine, 4-vinyl pyridine, 5-ethyl-2-vinyl pyridine and 2- or 4-vinyl quinoline. Such copolymeric materials are shown in U.S. Patent No. 2,491,471 to H. W. Arnold, dated December 20, 1949.

The recurring radical

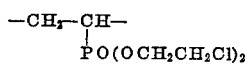

is derived from addition polymerization of bis(2-chloroethyl) vinylphosphonate. This compound may be prepared by the following type reactions:

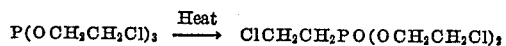

$$ClCH_2CH_2PO(OCH_2CH_2Cl)_2 \xrightarrow{alkali} CH_2:CHPO(OCH_2CH_2Cl)$$

Ethylene chlorohydrin may be substituted for ethylene oxide in the above equations.

It is an object of the present invention to provide a novel and useful polymer of acrylonitrile containing a recurring unit of the structure

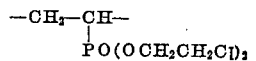

Another object is to provide a novel and useful shaped article from a polymer of acrylonitrile containing a recurring unit

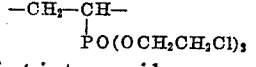

A further object is to provide a process for the preparation of a novel polymer of acrylonitrile containing a recurring unit of the structure:

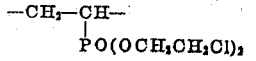

These and other objects will become apparent in the course of the following specification and claims.

In accordance with the present invention a polymer of acrylonitrile containing a recurring unit of the structure

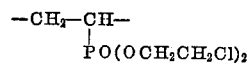

is prepared by copolymerizing bis(2-chloroethyl) vinylphosphonate and the monomer of a polymer of acrylonitrile as defined herein.

The shaped article prepared by extrusion, casting or the like from the polymer of the present invention is observed to possess less tendency to acquire and maintain static charge, a greater susceptibility to acetate (i.e. dispersed) and basic dyes and to be less flammable than such a shaped article prepared from a polymer of acrylonitrile in accordance with the teachings of the prior art.

The following examples are cited to illustrate the invention. They are not intended to limit the invention in any manner. The percentage composition of dye bath ingredients as employed herein is based on the weight of material dyed unless otherwise indicated. The fiber stick temperature reported in the examples is taken as the lowest temperature at which a fiber will just stick to a heated brass block when held against the surface of the block for 5 seconds under a 200 gram weight.

EXAMPLE I 68 parts acrylonitrile and 17 parts of bis(2-chloroethyl) vinylphosphonate are polymerized in a solution of 5.5 parts sodium lauryl sulfate, 2.4 parts potassium persulfate, and 2.4 parts sodium bisulfite in 1,150 parts water. The pH is adjusted to between 4.5 and 5.0 by addition of 5% sulfuric acid solution. The polymerization mixture is stirred at 40° C. for 17 hours under a blanket of nitrogen. The acrylonitrile copolymer is isolated by filtration of the precipitated polymer followed by washing and drying. A yield of 87% is obtained. The product has an intrinsic viscosity of 1.47 in dimethylformamide and contains 20.67% nitrogen and 6.31% chlorine. This corresponds to a composition ratio of 79% acrylonitrile and 21% bis(2-chloroethyl) vinylphosphonate.

The copolymer so prepared is dissolved in dimethylformamide to give a 27% solution. The solution is extruded at 120° C. through a five-hole spinneret, each orifice being 0.175 mm. in diameter into an air cell heated to 180° C. The filaments are drawn at 100° C. in a steam tube to 4 times their original length. They have a fiber stick temperature of 238° C. and a tenacity of 2 to 2.4 grams per denier. The filament does not support the propagation of a flame.

An aqueous dye bath is prepared containing the following:

| | Percent |
|---|---|
| p-Nitro,p′-ethyl, hydroxyethylamino azobenzene [1] | 3 |
| Sodium lauryl sulfate | 2 |

[1] Swiss Patent No. 149,405 (Nov. 16, 1931).

The filament is immersed in the bath at a bath to fiber ratio of 50:1 at the boil for one hour. The filament is dyed a deep shade of scarlet.

Filaments spun from polyacrylonitrile and also those prepared from the copolymer of 94% acrylonitrile and 6% methyl acrylate are merely stained by this bath under the same conditions. Furthermore these comparative samples readily propagated a flame applied to them.

EXAMPLE II 25 parts of the acylonitrile bis(2-chloroethyl) vinylphosphonate copolymer of Example I and 25 parts of polyacrylonitrile are dissolved in 150 parts of dimethylformamide. The solution is extruded at 125° C. through a five-hole (0.175 mm. diameter) spinneret into an air cell heated to 180° C. The filaments are drawn at 100° C. in a steam tube 6.5 times their original length. They exhibit a fiber stick temperature of 210° C. and a tenacity of between 3.2 and 3.5 g.p.d. Their rate of flame propagation is about 2 to 5 times lower than that of control filaments spun from the acrylonitrile homopolymer or methyl acrylate copolymer.

A sample of the fiber so prepared is dyed with an acetate dye in accordance with the dyeing process of Example I. A deep shade of scarlet is attained.

A second sample of the fiber is dyed with a basic dye by immersion for one hour at the boil in a bath comprising an aqueous solution containing the following:

| | Percent |
|---|---|
| Astrazone Red 6B [1] | 1 |
| Acetic acid | 1 |
| Sodium lauryl sulfate | 2 |

[1] "Synthetic Dyes," vol. II, p. 1174, by K. Venkataraman (Academic Press, Inc., N.Y., 1952).

The ratio of bath to fiber is maintained at 50:1. The fiber dyes a deep red. A control fiber of 96% acrylonitrile and 6% methyl acrylate is again only moderately stained.

EXAMPLE III 180 parts acrylonitrile and 20 parts of bis(2-chloroethyl) vinylphosphonate are polymerized in a solution of 24 parts sodium lauryl sulfate, 1 part potassium persulfate and 2 parts sodium bisulfite in 2450 parts water. The pH is adjusted to between 4.5 and 5 by the addition of 5% sulfuric acid solution. The polymerization mixture is agitated at 51° C. for 24 hours under a blanket of nitrogen. The acrylonitrile copolymer is isolated by precipitation with saturated salt solution followed by filtration, washing and drying. A yield of 73% is obtained. The product has an intrinsic viscosity of 2.9 in dimethylformamide and contains 22.12% nitrogen and 4.8% chlorine, corresponding to a composition ratio of 84% acrylonitrile and 16% bis(2-chloroethyl) vinylphosphonate.

Equal parts by weight of the copolymer prepared as described above and ethylene cyclic carbonate are mixed for 60 minutes in a Banbury mixer in a nitrogen atmosphere and at 60°–80° C. The plasticized mass is extruded at 180° C. through a 5-hole spinneret (orifice diameters of 0.007 inch) under a pressure of 500 pounds per square inch. The filaments are wound up at a rate of 100 yards per minute. After extraction in boiling water for 1 hour, they are drawn 7.6 times their extruded length at 118° C. The 36 denier filaments have a tenacity of about 3.5 grams per denier.

A sample of the fiber is dyed in accordance with the process of Example II. Deep shades are obtained. The fibers do not support the propagation of a flame.

EXAMPLE IV 56 parts acrylonitrile and 28 parts of bis(2-chloroethyl) vinylphosphonate are polymerized in a solution of 5.5 parts sodium lauryl sulfate, 2.4 parts potassium persulfate and 2.4 parts sodium bisulfite in 1000 parts water. The pH is adjusted to between 4.5 and 5 by the addition of 5% sulfuric acid solution. The polymerization mixture is stirred at 40° C. for 4 hours in a nitrogen atmosphere. The acrylonitrile copolymer is isolated by filtration of precipitated polymer followed by washing and drying. A 65.5% yield is obtained. The product has an intrinsic viscosity of 1.20 in dimethylformamide and contains 19.56% nitrogen and 6.74% chlorine. This corresponds to a composition ratio of 75% acrylonitrile and 25% bis(2-chloroethyl) vinylphosphonate.

Fibers are spun from the copolymers so prepared and dyed in accordance with the process of Example II. A deep shade of scarlet is obtained. The fibers do not support the propagation of a flame.

EXAMPLE V 18 parts acrylonitrile and 18 parts bis(2-chloroethyl) vinylphosphonate are polymerized in a solution of 6 parts sodium lauryl sulfate, 0.2 part potassium persulfate and 0.7 part sodium bisulfite in 600 parts water at 51° C. for 19 hours. A copolymer is isolated which has an intrinsic viscosity in dimethylformamide of 0.84. A yield of 53% is obtained. The product contains 9.59% chlorine, 3.97% phosphorus and 17.53% nitrogen, corresponding to a composition ratio of 67% acrylonitrile and 33% bis(2-chloroethyl) vinylphosphonate.

A film is cast from the copolymer so prepared and dyed in accordance with the process of Example II. A deep shade of scarlet is obtained. The film does not support the propagation of a flame.

EXAMPLE VI 43 parts acrylonitrile and 43 parts of bis(2-chloroethyl) vinylphosphonate are polymerized in a solution of 5.5 parts sodium lauryl sulfate, 2.4 parts potassium persulfate and 2.4 parts sodium bisulfite in 1000 parts water. The pH is adjusted to between 4.5 and 5.0 by addition of 5% sulfuric acid solution. The polymerization mixture is stirred at 40° C. for 18 hours in a nitrogen atmosphere. The acrylonitrile copolymer is isolated by filtration of precipitated polymer followed by washing and drying. A yield of 23.4% is obtained. The product has an intrinsic viscosity of 1.08 in dimethylformamide and contains 15.3% nitrogen and 12.48% chlorine, corresponding to a composition ratio of 58% acrylonitrile and 42% bis(2-chloroethyl) vinylphosphonate.

Fibers are spun from the copolymers so prepared and dyed in accordance with the process of Example II. Deep shades are obtained. The fibers do not support flame propagation.

EXAMPLE VII 8 parts bis((2-chloroethyl) vinylphosphonate, 8 parts ethyl methacrylate, 2 parts potassium styrenesulfonate, and 2 parts N-vinyl imidazole are copolymerized in a solution of 2 parts sodium lauryl sulfate, 1 part potassium persulfate and 1 part sodium bisulfite in 330 parts water at 40° C. for 18 hours. The copolymer is recovered from the polymerization mixture by precipitation with concentrated salt solution, followed by filtration, washing and drying. A yield of 35% is obtained. The copolymer contains 1.12% sulfur, 1.15% nitrogen and 1.99% chlorine. It is soluble in dimethylformamide. It has a composition ratio of 7% bis(2-chloroethyl) vinylphosphonate, 8% ethyl methacrylate, 81% potassium styrenesulfonate and 4% N-vinyl imidazole.

Equal parts of this copolymer and a polymer of acrylonitrile containing 94% acrylonitrile and 6% methyl acrylate are dissolved in dimethylformamide to give a solution of 10% solids content. A film is cast from this solution.

The flame propagation tendency of the film, prepared as described above is about 1.5 to 2 times less than a control film of 94% acrylonitrile–6% methyl acrylate. It is dyed to deep uniform shades at the boil for 1 hour (ratio of bath:film of 50:1) in an acid dye bath having the following composition:

| | Percent |
|---|---|
| Anthraquinone Blue Sky (C.I. 1088) | 3 |
| Sulfuric acid | 3 |
| Sodium lauryl sulfate | 2 |

Excellent dyeings are also obtained with the acetate and basic dye baths of Example II.

A control film produced from polyacrylonitrile in a similar fashion is highly flammable and is not stained by the acid dyes. The control is only weakly stained in the acetate and basic dye baths.

While the invention has been particularly described with reference to a polymer of acrylonitrile with recurring units of the structure:

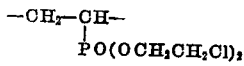

the invention is broadly applicable to such polymers wherein the recurring unit corresponds to the structure:

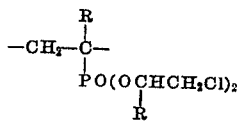

wherein R is a radical of the class hydrogen alkyl, aryl, haloalkyl and haloaryl. The monomer employed in creating this recurring unit by addition polymerization, i.e.,

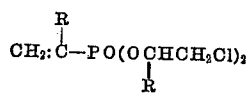

can be prepared in general by reacting the halohydrin

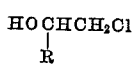

with $PCl_3$, heating to effect rearrangement and then treating with strong base to remove one mole of HCl. As has been illustrated it can be polymerized to form a homopolymer and can also be copolymerized with an ethylenically unsaturated addition polymerizable monomers such as acrylonitrile. High molecular weight copolymers with ethylenically unsaturated monomers other than a polymer of acrylonitrile can also readily be prepared by copolymerizing the bis(2-chloroethyl) vinylphosphonate monomer with such monomers as styrene, vinyl acetate, methyl acrylate, ethylmethacrylate, vinyl imidazole, acrylic acid, styrenesulfonic acid, their mixtures, salts and the like. Copolymerization may be carried out in the usual manner in emulsion or solution systems if desired in the presence of the usual polymerization initiators and catalysts. A suitable catalyst is, for instance, benzoyl peroxide which may be applied in the usual small amounts of 0.001% to 0.1% based on the monomer.

The minimum amount of the bis(2-chloroethyl) vinylphosphonate recurring structure required to sensibly modify a particular property of its addition copolymer will depend upon the property which it is desired to modify and the monomer with which the bis(2-chloroethyl) vinylphosphonate is copolymerized. It has been observed that as little as 3% by weight of the final copolymer of bis(2-chloroethyl) vinylphosphonate is effective in increasing the susceptibility of a polymer of acrylonitrile to acetate dyes. The flame propagation tendencies of a polymer of acrylonitrile are visibly decreased when as little as 6% by weight of the final copolymer of bis(2-chloroethyl) vinylphosphonate is incorporated as a copolymer. A copolymer of a polymer of acrylonitrile containing about 10% by weight of final copolymer as bis(2-chloroethyl) vinylphosphonate is generally sensitive to acid, basic and acetate dyes. A 12% to 20% bis(2-chloroethyl)vinylphosphonate component is preferred. Higher amounts may be incorporated but above about 50%, undue sacrifice of the usual high melting point is observed. The copolymer of a polymer of acrylonitrile will generally fail to propagate a flame when about 12% of bis(2-chloroethyl) vinylphosphonate is present.

The copolymeric addition polymerization product may contain groups other than that derived from bis(2-chloroethyl) vinylphosphonate to further enhance dyeability of the final shaped article to various dyes. Thus addition polymerization copolymeric products produced from monomers which include those having acidic constituents such as acrylic acid, methacrylic acid, potassium styrenesulfonate or mixtures thereof and bis(2-chloroethyl) vinylphosphonate possess particular sensitivity toward basic dyes such as C.I. 681, C.I. 662, C.I. 788. In a similar manner addition polymerization copolymeric products produced from monomers which include those having basic constituents such as vinyl pyridine, vinylpyrolidine, acrylamide or mixtures thereof and bis(2-chloroethyl) vinylphosphonate possess particular sensitivity toward acid dyes such as C.I. 176, C.I. 161, C.I. 1088, C.I. 289. Sensitivity toward acetate dyes such as 1-amino-4-hydroxyanthraquinone (red), 1,4,5,8-tetra-aminoanthraquinone (blue) and 1-amino-2-methyl-anthraquinone can be enhanced by preparing the addition polymerization copolymeric product from bis(2-chloroethyl) vinylphosphonate and monomers having carboxylic ester constituents such as methyl acrylate, vinyl acetate, ethyl acrylate, and methyl methacrylate. In addition to or in place of copolymerizing monomers which enhance dye sensitivity of the shaped article, neutral addition polymerization monomers such as styrene, vinyl toluene, isobutylene, alpha-methyl styrene and vinyl chloride may be copolymerized with bis(2-chloroethyl) vinyl phosphonate.

A higher percentage by weight of recurring units of bis(2-chloroethyl) vinylphosphonate can be embodied in a polymer of acrylonitrile with less effect upon melting point than is possible by employing it as a copolymeric component, by blending the polymeric or copolymeric bis(2-chloroethyl) vinylphosphonate with a polymer of acrylonitrile. This is accomplished by making a solution containing both the polymer of acrylonitrile and the polymeric or copolymeric bis(2-chloroethyl) vinylphosphonate and thereafter removing the solvent concurrently with formation of a shaped article. The technique is illustrated in Example II above. The following example illustrates formation of such a blended polymeric shaped article wherein the homopolymeric bis(2-chloroethyl) vinylphosphonate constitutes one component.

EXAMPLE VIII 20 parts of bis(2-chloroethyl) vinylphosphonate and 0.4 part $\alpha,\alpha'$-azodi($\alpha,\gamma$-dimethylvaleronitrile) are mixed and kept at 51° C. for 25 hours with agitation under nitrogen. A viscous, pale yellow polymer is obtained in quantitative yield. 22 parts of the homopolymer thus obtained and 87 parts of an acrylonitrile methyl acrylate copolymer containing 94% acrylonitrile and 6% methyl acrylate prepared as described in Example II of U.S. Patent No. 2,436,926 are dissoived in 221 parts of dimethylformamide. The solution heated to 127° C. is extruded at a pressure of 110 p.s.i. through a spinneret having five holes of 0.175 mm. diameter each into an air cell heated to 180° C. The filament is collected at a windup speed of 112 yards per minute. It is drawn in a tube containing 30 pounds per square inch of steam to 8 times its extruded length. The filament has a fiber stick temperature of 196° C. and a tenacity of 4.5 grams per denier. Its rate of flame propagation is about 2 to 3 times lower than that of a control filament spun from the acrylonitrile methyl acrylate copolymer.

The filament prepared as described above is dyed in the bath and under the conditions of Example I. It is dyed a deep red shade. A comparative filament of acrylonitrile methyl acrylate is only moderately stained in the same dye bath.

Another observed advantage resulting from the presence of polymeric or copolymeric bis(2-chloroethyl) vinylphosphonate in a shaped article produced from a polymer of acrylonitrile is a reduction in static potential developed by such yarn and an increase in the rate of charge decay of such static. The presence of at least about 8% by weight of recurring structures of bis(2-chloroethyl) vinylphosphonate in the final product is generally effective in noticeably decreasing electrostatic propensities of such shaped articles. Larger amounts may be employed, as high as about 50%, depending upon the intended form and use of the final product, with correspondingly greater advantages in this regard. For textile materials, i.e., yarns, filaments, staple and the like, inclusion of from about 12% to about 20% of the modifying phosphonate component is preferred. The following example illustrates the effect of the phosphonate radical as defined on the electrostatic properties.

EXAMPLE IX

An endless belt of about 400 denier formed by plying filament produced as described in Example VIII, is statically charged by contacting it with a grounded aluminum rod of ½ inch diameter. Contact is made by revolving the belt over the rod at a rate of about 270 inches per minute. The charge induced at various humidities is observed with an Electrometer detector (Model 210, manufactured by Keithley Instruments of Cleveland, Ohio). A similar belt of filament formed from polyacrylonitrile serves as a control. The results obtained are reported in Table I.

*Table 1*

| Relative Humidity (Percent) | Static Potential (Volts) | |
|---|---|---|
| | Control Yarn | Test Yarn |
| 40% | 4,000 | 2,240 |
| 50% | 4,000 | 1,740 |
| 60% | 3,040 | 1,240 |

Charge decay at 60% humidity of polyacrylonitrile is found to be 0 over a five minute period. In contrast with this the test yarn at the same relative humidity is found to have lost ½ of its charge in 21 seconds.

The shaped articles are produced from a polymer of the present invention by the methods known to the art. This can be done by spinning or extruding or casting solutions of the polymers or polymer mixtures using solvents like cyclic tetramethylene sulfone dimethylformamide, dimethylacetamide or solutions formed with assistance of hydrotropic agents and using the dry or wet spinning methods. Shaped articles may be produced from the plasticized molten polymer by the technique described in United States application Ser. No. 200,497, filed December 12, 1950, now Patent No. 2,706,674, by extrusion, casting, molding or the like. The fibers and films can be oriented by the usual drawing steps. A convenient way of producing oriented fibers from the modified polymers of the invention comprises spinning a solution of the polymer in dimethylformamide into a hot cell and extracting the spun yarn in a 3% aqueous dimethylformamide solution at the boiling temperature for ½ hour and drawing the extracted fiber through a steam tube at atmospheric pressure.

The shaped articles of the present invention have particular utility in the preparation of continuous filaments, spun yarn and the like which may be used in the preparation of textiles such as knit goods, dresses, socks, woven fabrics, curtains, carpets and the like.

Many equivalent modifications will be apparent to those skilled in the art from a reading of the above description without a departure from the inventive concept.

What is claimed is:

1. A synthetic linear addition copolymer composed of at least 50% acrylonitrile and up to 50% of at least one monoethylenically unsaturated monomer copolymerized with the said acrylonitrile, the said copolymer containing, in polymeric form, at least 3% by weight of a recurring unit of the structure

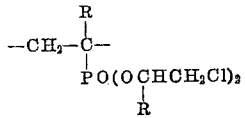

wherein R is hydrogen.

2. The addition copolymer of claim 1 wherein the monoethylenically unsaturated monomer is methyl acrylate.

3. The addition copolymer of claim 1 wherein the monoethylenically unsaturated monomer is potassium styrenesulfonate.

4. The addition copolymer of claim 1 wherein the monoethylenically unsaturated monomer is N-vinyl imidazole.

5. A polymer composition comprising a polymer selected from the group consisting of polyacrylonitrile and a polymer containing at least 50% of acrylonitrile and up to 50% of at least one monoethylenically unsaturated monomer copolymerized with the said acrylonitrile, the said composition containing in polymeric form at least 3% by weight of the recurring unit of the structure

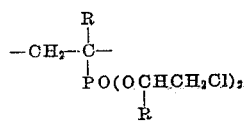

wherein R is hydrogen.

6. A polymer composition comprising a blend of (A) a polymer selected from the group consisting of polyacrylonitrile and a polymer containing at least 50% of acrylonitrile and up to 50% of a monoethylenically unsaturated monomer copolymerized with the said acrylonitrile, and (B) a polymer containing the recurring unit of the structure

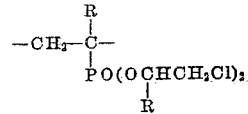

wherein R is hydrogen; the said recurring unit being present in the said composition in amounts of at least 3% by weight.

References Cited in the file of this patent

UNITED STATES PATENTS

| 2,439,214 | Lindsey | Apr. 6, 1948 |
| 2,557,805 | Upson | June 19, 1951 |
| 2,603,621 | Craig et al. | June 15, 1952 |
| 2,671,106 | Albisetti et al. | Mar. 2, 1954 |

OTHER REFERENCES

Kosolapoff: Chem. Abst., volume 42 (1948), column 4132i.